US012058495B2

(12) United States Patent
Recker et al.

(10) Patent No.: US 12,058,495 B2
(45) Date of Patent: Aug. 6, 2024

(54) USING A CAMERA FOR HEARING DEVICE ALGORITHM TRAINING

(71) Applicant: STARKEY LABORATORIES, INC., Eden Prairie, MN (US)

(72) Inventors: Karrie LaRae Recker, Edina, MN (US); Justin R. Burwinkel, Eden Prairie, MN (US); Jingjing Xu, Eden Prairie, MN (US)

(73) Assignee: STARKEY LABORATORIES, INC., Eden Prairie, MN (US)

( * ) Notice: Subject to any disclaimer, the term of this patent is extended or adjusted under 35 U.S.C. 154(b) by 194 days.

(21) Appl. No.: 17/790,363

(22) PCT Filed: Jan. 27, 2021

(86) PCT No.: PCT/US2021/015233
§ 371 (c)(1),
(2) Date: Jun. 30, 2022

(87) PCT Pub. No.: WO2021/154822
PCT Pub. Date: Aug. 5, 2021

(65) Prior Publication Data

US 2023/0104683 A1 Apr. 6, 2023

Related U.S. Application Data

(60) Provisional application No. 62/966,318, filed on Jan. 27, 2020.

(51) Int. Cl.
*H04R 25/00* (2006.01)

(52) U.S. Cl.
CPC ........... *H04R 25/505* (2013.01); *H04R 25/43* (2013.01); *H04R 25/609* (2019.05); *H04R 2225/39* (2013.01); *H04R 2225/41* (2013.01)

(58) Field of Classification Search
None
See application file for complete search history.

(56) References Cited

U.S. PATENT DOCUMENTS 5,721,783 A 2/1998 Anderson
9,042,596 B2 5/2015 Connor
(Continued)

FOREIGN PATENT DOCUMENTS

DE 10147812 4/2003
DE 102014218832 3/2016
(Continued)

OTHER PUBLICATIONS

International Search Report and Written Opinion from PCT Application No. PCT/US2021/015233 dated Apr. 14, 2021 (9 pages).
(Continued)

*Primary Examiner* — Mark Fischer
(74) *Attorney, Agent, or Firm* — Mueting Raasch Group

(57) ABSTRACT

A system includes an image sensor, a hearing device, and a controller. The controller may include one or more processors and may be operatively coupled to the image sensor and the audio sensor. The controller may be configured to receive image data from the image sensor and sound data from the hearing device. The controller may further be configured to identify one or more optical components using the image data, each of the one or more optical components associated with an object or activity; determine one or more audio objects using at least the one or more optical components and the sound data, the one or more audio objects may each include an association between at least a portion of the sound data and the object or activity; and adjust an audio class using the one or more audio objects, the audio class associated with the object or activity.

22 Claims, 4 Drawing Sheets

(56) References Cited

U.S. PATENT DOCUMENTS

| | | | |
|---|---|---|---|
| 9,124,303 | B2 | 9/2015 | Maenpaa |
| 9,124,990 | B2 | 9/2015 | Strelcyk et al. |
| 9,198,621 | B2 | 12/2015 | Fernstrom et al. |
| 9,210,517 | B2 | 12/2015 | Pontoppidan et al. |
| 9,254,099 | B2 | 2/2016 | Connor |
| 9,264,824 | B2 | 2/2016 | Pruthi et al. |
| 9,491,553 | B2 | 11/2016 | Liu et al. |
| 9,508,269 | B2 | 11/2016 | Slamka |
| 9,529,385 | B2 | 12/2016 | Connor |
| 9,536,449 | B2 | 1/2017 | Connor |
| 9,668,069 | B2 | 5/2017 | Han et al. |
| 9,709,406 | B2 | 7/2017 | Bastiaensen et al. |
| 2011/0280422 | A1 | 11/2011 | Neumeyer et al. |
| 2012/0053826 | A1 | 3/2012 | Slamka |
| 2013/0343585 | A1 | 12/2013 | Bennett et al. |
| 2015/0036856 | A1 | 2/2015 | Pruthi et al. |
| 2015/0125017 | A1 | 5/2015 | Uhm et al. |
| 2015/0126873 | A1 | 5/2015 | Connor |
| 2015/0168365 | A1 | 6/2015 | Connor |
| 2016/0034764 | A1 | 2/2016 | Connor |
| 2016/0037137 | A1 | 2/2016 | Seiflein |
| 2016/0080874 | A1 | 3/2016 | Fullam |
| 2016/0112684 | A1 | 4/2016 | Connor |
| 2016/0140870 | A1 | 5/2016 | Connor |
| 2016/0183014 | A1 | 6/2016 | Guo et al. |
| 2016/0232811 | A9 | 8/2016 | Connor |
| 2018/0132044 | A1 | 5/2018 | Boesen |
| 2022/0021985 | A1 * | 1/2022 | Wexler .................... G10L 25/51 |

FOREIGN PATENT DOCUMENTS

| | | | |
|---|---|---|---|
| EP | 2871857 | 5/2015 | |
| EP | 2922312 | 9/2015 | |
| WO | WO-2020079485 A2 * | 4/2020 | ............. G03B 31/00 |

OTHER PUBLICATIONS

Does Eating Fast Make You Gain More Weight? Healthline, Sep. 26, 2019, www.healthline.com/nutrition/eating-fast-causes-weight gain (11 pages).

Food Recognition Technology, Sep. 26, 2019, www.sri.com/engage/products-solutions/food-recognition technology (4 pages).

Amft et al., "Analysis of Chewing Sounds for Dietary Monitoring," Wearable Computer Lab, Swiss Federal Institute of Technology, Zurich, Switzerland, 2005 (17 pages).

Akpa et al., "Smartphone-Based Food Weight and Calorie Estimation Method for Effective Food Journaling," SICE Journal of Control, Measurement, and System Integration, vol. 10, No. 5, pp. 360-369, Sep. 2007 (10 pages).

* cited by examiner

USING A CAMERA FOR HEARING DEVICE ALGORITHM TRAINING

RELATED PATENT APPLICATIONS

This application is a U.S. National Stage application under 35 U.S.C. 371 of PCT Application No. PCT/US2021/015233, filed Jan. 27, 2021, which claims priority to U.S. Provisional Application No. 62/966,318, filed Jan. 27, 2020, the contents of which are hereby incorporated by reference in their entireties.

TECHNICAL FIELD

This application relates generally to hearing devices, including hearing aids, bone conduction hearing devices, personal amplification devices, hearables, wireless headphones, wearable cameras, and physiologic, or position/motion sensing devices.

BACKGROUND

Hearing devices provide sound for the user. Some examples of hearing devices are headsets, hearing aids, speakers, cochlear implants, bone conduction devices, and personal listening devices. Hearing devices often include information about the sound characteristics of hearing environments including objects within the hearing environment that may improve the signal to noise ratio provided by the hearing device. However, a limited number of environments may be classified because it may be prohibitive to exhaustively capture every scenario that an individual may encounter, particularly if the sound or activity is rare or if it has acoustic, positional, or other sensor signatures (e.g., properties) that are similar to those of other sounds and activities.

SUMMARY

Embodiments are directed to a system, including an image sensor, a hearing device and a controller. The image sensor may be configured to sense optical information of an environment and produce image data indicative of the sensed optical information. The hearing device may include a housing and an audio sensor. The housing may be wearable by a user. The audio sensor may be coupled to the housing and configured to sense sound of the environment and provide sound data using the sensed sound. The controller may include one or more processors and may be operatively coupled to the image sensor and the audio sensor. The controller may be configured to receive the image data and sound data. The controller may further be configured to identify one or more optical components using the image data, each of the one or more optical components associated with an object or activity; determine one or more audio objects using at least the one or more optical components and the sound data, the one or more audio objects may each include an association between at least a portion of the sound data and the object or activity; and adjust an audio class using the one or more audio objects, the audio class associated with the object or activity.

Embodiments are directed to a system, including an image sensor, a hearing device and a controller. The image sensor may be configured to sense optical information of an environment and produce image data indicative of the sensed optical information. The hearing device may include a housing and an audio sensor. The housing may be wearable by a user. The audio sensor may be coupled to the housing and configured to sense sound of the environment and provide sound data using the sensed sound. The controller may include one or more processors and may be operatively coupled to the image sensor and the audio sensor. The controller may be configured to receive the image data and sound data. The controller may further be configured to identify one or more optical components using the image data, each of the one or more optical components associated with an activity; determine one or more audio objects using at least the one or more optical components and the sound data, the one or more audio objects each include an association between at least a portion of the sound data and the activity; and adjust an audio class using the one or more audio objects, the audio class associated with the activity.

Embodiments are directed to a system including an image sensor, a hearing device, and a controller. The image sensor may be configured to sense optical information of an environment and produce image data indicative of the sensed optical information. The hearing device may include a housing and an audio sensor. The housing may be wearable by a user. The audio sensor may be coupled to the housing and configured to sense sound of the environment and provide sound data using the sensed sound. The controller may include one or more processors and may be operatively coupled to the image sensor and the audio sensor. The controller may be configured to receive the image data and sound data. The controller may further be configured to identify one or more optical components using the image data; determine one or more assistive listening technologies using at least the one or more optical components; and connect to the determined one or more assistive listening technologies.

Embodiments are directed to a method that may include identifying one or more optical components using image data provided by an image sensor, each of the one or more optical components associated with an object or activity; determining one or more audio objects using at least the one or more optical components and sound data provided by an audio sensor, the one or more audio objects each comprising an association between at least a portion of the sound data and the object or activity; and adjusting an audio class using the one or more audio objects, the audio class associated with the object or activity.

Embodiments are directed to a method that may include identifying one or more optical components using image data provided by an image sensor, each of the one or more optical components associated with an activity; determining one or more audio objects using at least the one or more optical components and sound data provided by an audio sensor, the one or more audio objects each comprising an association between at least a portion of the sound data and the activity; and adjusting an audio class using the one or more audio objects, the audio class associated with the activity.

Embodiments are directed to a method that may include identifying one or more optical components using image data provided by an image sensor; determining one or more assistive listening technologies using at least the one or more optical components; and connecting to the determined one or more assistive listening technologies.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1A:
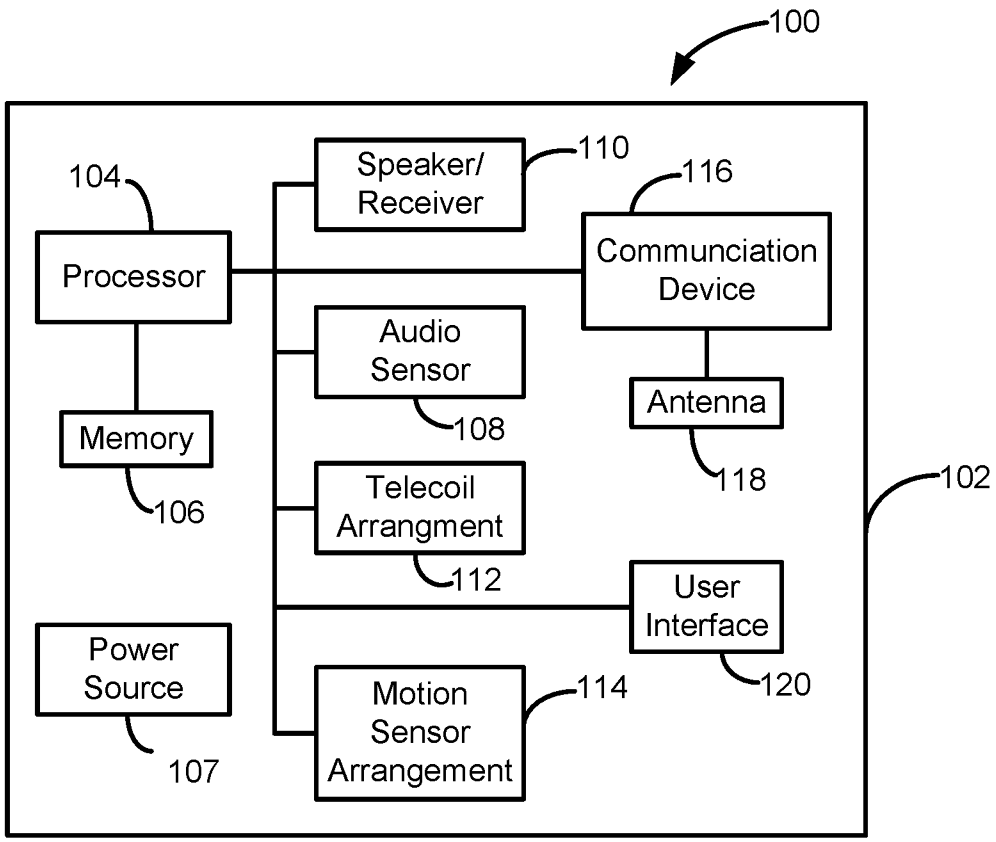
FIG. 1A is a system block diagram of an ear-worn electronic hearing device configured for use in, on, or about an ear of a user in accordance with any of the embodiments disclosed herein.

Embodiments of the disclosure are directed to systems and methods using an image sensor in conjunction with a hearing device to classify sound sources (e.g., adjust or create an audio class). Embodiments of the disclosure are directed to systems and methods to identify optical components that indicate the presence of an assistive listening technology and adjust the hearing device to connect to the assistive listening technology.

Hearing devices may classify a limited number of acoustic environments (e.g., speech, noise, speech in noise, music, machine noise, and wind noise) and physical activities (e.g., walking, jogging, biking, lying down, standing, etc.). The number of environments classified may be limited because hearing devices may not exhaustively capture every sound or scenario that an individual may encounter, particularly if the sound or activity is rare or if the sound or activity has acoustic, positional, or other sensor signatures (e.g., properties) that are similar to those of other sounds or activities. However, a system including at least one image sensor and one or more hearing devices can provide a system that can determine a user's environment or current activity and determine information about the acoustics of the environment, the user's movements, the user's body temperature, the user's heart rate, etc. Such information can be used to improve classification algorithms, audio classes, and recommendations to hearing device users.

The system may use the image sensor to detect an object or activity that is a source of sound. In one example, the system may use the image sensor to detect a fan and the hearing device to detect the sound produced by the fan. The image sensor and associated system may document a variety of information about the fan such as, for example, its brand, its dimensions, its position relative to the hearing device user (e.g., the fan may be approximately 6' from the hearing aid user, 30° to the left of the hearing aid user, 50° below the horizontal plane of the hearing devices), its acoustic properties (e.g., the overall sound level, the frequency-specific levels, the signal-to-noise ratio; the sound classification, etc.), its rotational periodicity and timing, and its location and associated properties (e.g., the fan and user may be indoors, in a room approximately 10'×12' that is carpeted with curtains and has a reverberation time of approximately 400 msec, etc.).

Furthermore, the system may use a controller and/or a communication device to conduct a search of the Internet or a database (e.g., stored in a cloud server) to gather additional information about the fan or other items in the environment. As a database of different types of fans, objects, and activities in various acoustic environments is expanded, the ability to identify and classify the detected sound source may increase. Still further, if the user makes adjustments to the hearing device settings in an environment, such information can be used to make recommendations to others in similar environments. Still further, using an image sensor can provide for real-time recommendations to be made to the user. For example, the hearing device may provide an audible message to the user such as, "turning down the fan should improve the signal-to-noise ratio (SNR)," or, if the hearing device or devices have directional microphones, "sitting so that the noise is behind you should improve your ability to understand speech."

It should be noted, that while a fan was used as one example of an object or sound source, any number of objects, activities, or other sound sources can be identified and classified. Such sound sources may include, for example, sounds that people or animals make, sounds that objects (e.g., machinery, loudspeakers, instruments, etc.) make, sounds of nature (e.g., the wind blowing, water moving, thunder, etc.), sounds of movement or manipulation (e.g., someone jogging, typing on a keyboard, opening a pop or soda can, hitting a ball with a bat, a music box, a furnace running, etc.), etc.

The system may be used to detect activities. In one example, the image sensor may detect that the user is kayaking. The system may capture acoustic properties of the environment, what is happening during the activity (e.g., wind blowing, waves hitting the kayak, paddle noise, etc.), positional and movement data from an inertial measurement unit (IMU), and data (e.g., heart rate, GPS and temperature, etc.) from other sensors of the hearing device or operably coupled computing devices (e.g., mobile device, smart watch, wearables, etc.). All such data collected by the system may be captured for analysis (real-time or off-line) to improve an understanding of how the acoustic environment varies in real-time based on the user's actions and environment. Such an understanding can be used to improve the hearing device settings assigned to the user (e.g., increase wind noise reduction) and to make recommendations to the user about the activities being performed by the user. Such recommendations may be based on goals created by the user (e.g., by entering them into an app). For example, the system may provide an audio recommendation to the user that states, "kayaking for another 5 minutes should burn off the calories from the last cookie that you ate."

In other words, the image sensor of the system may capture image data. The controller of the system may determine an optical component using the image data, determine an audio object using the optical component and sound data, and adjust an audio class using the audio object. As used herein, "image data" may include individual pictures or video. As used herein an "optical component" may be image data associated with an object or activity including movement of the image frame, movement of an object within the image data, or an object within the image data. As used herein, an "audio object" may be an association between sound data and an object or activity. The sound data may include sound characteristics such as, e.g., an overall sound level, frequency specific sound levels, an estimate of the signal to noise ratio (SNR), reverberation time, etc.

As used herein, an "audio class" may be information about the sound characteristics of a class of objects or activities or a specific object or activity. Each audio class may be generated using audio objects associated with the audio that audio class. A class of objects may include a broad range of objects under a general classification such as, e.g., fans, keyboards, motors, refrigerators, dishwashers, etc. A class of activities may include a broad range of activities under a general classification such as, e.g., running, jumping, skating, lifting weights, eating, typing, etc. A specific object may be associated with a specific thing such as e.g., a particular keyboard, fan, doorbell, automobile, etc. The specific object may also be associated with a particular person such as, e.g., a parent, child, friend, or other person that may be frequently encountered by a user. An audio class may be any category of sound that is distinct enough that it can be individually recognized and differentiated from other sounds. For example, cats meowing may be a broad audio class; however, a user's cat meowing may be a more specific audio class. An audio class may be differentiated from other audio classes using any combination of the sound's sound pressure level, pitch, timbre, spectral tilt, duration, frequency of occurrence, periodicity, fundamental frequency, formant relationships, harmonic structure, the envelope of the signal including the its attack time, release time, decay, sustain, transients, the time of day at which it occurs, the geographic location where sound occurs, etc.

Advantageously, providing a system including an image sensor and a hearing device as described herein can provide for audio classes to be updated without significant user (e.g., user) interaction. Additionally, new audio classes can be identified, generated, and provided to any hearing device user. Furthermore, audio classes may be adjusted for each user and personal audio classes may be generated. Settings for a particular environment, activity, or person can be loaded to the hearing device when such environment, activity, or person is detected by the image sensor or hearing device. Recommendations can be made to the user in real-time using the audio objects or optical components detected in the environment. Furthermore, the user's own history can be used to inform the probability of different audio classes for that individual (e.g., by taking into consideration factors such as the time of day that the user typically enters certain acoustic environments or performs certain activities, the frequency with which the user enters these environments or performs these activities, the amount of time that the user normally spends in such environments or performing such activities, etc.) and for the population(s) to which the user belongs.

In one example, the system may use the image sensor to detect the food that the user is eating and match it up with the acoustics of the person chewing. The detected food may be further matched up with movement of the image frame or data from motion sensors. Different foods can have different acoustic signatures. Such differences in acoustic signatures may be useful for identifying specific foods. Accordingly, the system may capture what the user is eating in real-time and associate the food being eaten with sounds detected at the time of consumption. In this manner, the system can learn the acoustic signatures of a variety of foods including, for example, what various foods sound like when being chewed, how such sounds change depending on the quantity of food being chewed. Additionally, the system can determine the average number and range of chews for the user based on food type and quantity of food. Such information may be used to coach the user into eating more (or less) of certain foods, to changing their eating speed, or improving estimates of the user's caloric intake. Such information may also be used to create normative values for different groups of people based on their age, weight, height, gender, geographic location, occupation, activity levels, and other personal or demographic information. Once established, such normative values may be used to access and coach the eating patterns of those who do not have a camera paired to their hearing devices.

Additional information about the food may be gathered through user input, additional sensors, etc. Information about the food may, for example, be provided by the user about the food in a food-tracking app. The food-tracking app or data provided by the food-tracking app may be used to identify food. Furthermore, an infrared sensor or camera may be used to determine the food's temperature. Data captured by the infrared sensor may be used, for example, to determine the manner in which the food was prepared. Information about the food gathered from various sources may be used to define the acoustic signatures of the food.

With continued use, the system can "remember" certain situations, people, foods and activities so that the audio class or acoustic scene (e.g., the acoustic properties and the audio objects of a location, person, or activity) may not need to be rebuilt each time the individual experiences or encounters such and the system may instead continue to analyze the data associated with the environment to determine updates or adjustments to the audio class (e.g., further refine, or determine changes). One advantage of the system being able to remember situations, people, foods, and activities is that as a user enters an environment, performs an activity, or encounters someone associated with a known audio class, the hearing device parameters can be automatically configured to settings for that audio class without waiting for a detailed analysis of the current environment.

In some embodiments, the image sensor of the system may be used to identify locations where assistive listening technologies are in use. For example, the National Association of the Deaf created a logo that may be placed outside of public venues where various assistive listening technologies are available. Signs that include this logo may indicate the types of assistive listening technology available. For example, the "T" character may be visible in the bottom right-corner of a sign at venues where an induction hearing loop is available. It may be helpful to the user if the system alerted the user to the availability of the system, automatically switched the appropriate settings for use of the assistive listening system, or provided the user with instructions on how to use the assistive listening system. Such functionality may be helpful because different assistive listening systems couple differently with the user's hearing devices. For example, the system may instruct the user to visit patron relations (e.g., customer service) representatives for a compatible neck loop device.

In one example, after identifying the location offering the assistive listening technology, the location may be tagged. During subsequent visits to the tagged location the hearing devices may connect to the assistive listening technology using the tag. The tag may include information about the assistive listening technology such as, for example, hearing device settings to connect to the assistive listening technology. The location may be tagged, for example, using GPS coordinates. The tag may be a virtual beacon or information stored in a server. The tag may be accessed by the user's system or by the systems of other users.

Another advantage of using an image sensor to train hearing device algorithms is that the image sensor may allow for individualized training of the hearing device algorithms. This may be particularly useful if a user participates in unique or rare activities (e.g., rock climbing, sailing, roller skating, etc.) or if the user has a unique gait, posture, heart rate, temperature, or other unique characteristic during activities. Knowledge of an individual user's activity history may also improve the audio class accuracy by taking into consideration factors such as the time of day at which an user typically enters certain environments or performs certain activities, the frequency with which the user typically performs these activities, and the amount of time that the user normally spends in such environments or performing such activities.

Even though the image sensor may continue to provide benefit to a user over time (and the system can continue to learn from the individual), the audio classes and the hearing device algorithms may become so robust over time that they may be able to determine audio classes of environments and activities without the image sensor. Further, the improvements made to known audio classes and databases thereof may be used to create better classification schemes for all hearing devices, even those that are not paired with an image sensor. For example, tags or audio classes stored in servers may be accessed by hearing devices of users that are not paired with an image sensor.

In some embodiments, an image sensor may be worn without, or prior to use of, a hearing device. For example, a user may wear an image sensor for a week prior to an appointment with an audiologist such that appropriate device recommendations and settings may be determined before purchase of or initial programming of a hearing device. The image sensor may be an image sensor accessory. The image sensor accessory (e.g., smart glasses, wearable camera, etc.) may include other sensors (e.g., an Inertial Measurement Unit (IMU), Global Positioning System (GPS) sensor, heart rate sensor, temperatures sensor, etc.) that may help classify the typical environments and activities of the user. In at least one embodiment, images, audio, and data tracings captured by the image sensor accessory may be presented to the audiologist or user. In other embodiments, the results of a machine learning classifier may be presented to the audiologist or user. In still further embodiments, the recommendations and settings prescribed to the user may be automatically populated by the system.

An image sensor may capture optical or visual details of an environment in which the user is situated. This may include information such as, e.g., a geographic location of the user (e.g., Global Positioning System coordinates), a building type (e.g., home, office, coffee shop, etc.), whether the user is indoors or outdoors, the size of the room, the brightness of the room, furnishings (e.g., carpeted or not, curtains or not, presence of furniture, etc.), the size of such objects, which objects are likely sound-producing objects (e.g., T.V., radio, fan, heater, etc.), details about such objects (e.g., brand names or size estimates), an estimate of certain acoustic properties of objects in the room (e.g., the likelihood to reflect or absorb various sounds), people or animals that are present, the position of the user relative to objects (e.g., furniture, people, animals, etc.), the focus of the user (e.g., what is captured in the camera), facial expressions, and the food that the user is eating.

Information gathered by the image sensor may be paired with information gathered by the hearing device. Information gathered by the hearing device may include sounds, overall sound level decibels (dB), frequency-specific sound levels, estimates of the SNR (overall and frequency-specific), the current sound classification, reverberation time, interaural time and level differences, emotions of the user or others in the room, and information about the user (e.g., the user's head position, heart rate, temperature, skin conductance, current activity, etc.).

In some examples, as a user enters a room, a comparison of the visual and acoustic information received by the system can be used to determine objects that are actively producing sound. Such a determination may be accomplished using the received acoustic information with measures of how the sound level, estimated SNR, and sound classification change as the user moves throughout the room. As the user moves through the room, sound received from the sound sources may get louder and the SNR may increase as the user approaches the sound sources. In contrast, the sound received from the sound sources may become quieter and the SNR may get lower as the user moves away from the sound sources. Furthermore, comparing the interaural time, level, intensity, or SNR differences between two hearing devices can help to localize a sound source within a room or space. Once a sound source is identified within a room, information gathered by the system about the sound source can be stored as part of the environmental scene or audio class.

For example, a user using the system described herein may enter a living room with a fan in it. The image sensor may identify the fan as a potential sound source, and the hearing devices of the system may confirm that noise was detected at approximately 45-60 dB sound pressure level (SPL), and that the source of this sound was from the direction of the fan. The system may conduct a search of the Internet or a database to confirm that such gathered information is consistent with product information provided by the manufacturer or others. Such sound information could then be "attached" to this object to generate an audio object. If the user enters this same living room again or enters another room with the same type of fan, the sound may be identified more quickly using the generated audio object associated with the fan. Additional information about the user may also be captured in this environment (e.g., the user is looking out the window, the user's heart rate is 60 beats per minute, the user's body temperature is 98.6°, etc.).

As data is collected (stored either on the image sensor apparatus, hearing device, computing device, or some combination thereof), it may be uploaded to the cloud for analysis and algorithm improvement. Furthermore, if the user adjusts the hearing devices, such information may be recorded and used to make recommendations to others in similar situations or environments. Alternatively, if others have made adjustments to their hearing devices in similar environments to the user, the user may receive a recommendation to make similar changes to the user's hearing devices. The recommendation may be provided through an audio indication via the hearing devices (e.g., "in this environment others have found a different setting to be helpful, would you like to try it now?") or via a computing device operably coupled to the hearing devices.

User input may be used when identifying optical components such as, for example, objects or activities. In one example, the user may be presented with an image of object or activity on a display. The user may be prompted to point to, verbally indicate, or otherwise identify the object or activity presented. The system may then identify the object or activity within the image data based on the user input. The object or activity and any associated sound may associated (e.g., audio object) and stored.

In another example, the hearing devices may isolate a sound detected in the user's environment and play it back to the user. The sound may be played back through the hearing devices, smartphone, or other connected audio device. The sound may include, for example, fan noise, refrigerator humming, someone playing the piano, someone jumping rope, or any other sound detected. The user may be prompted to look at, point to, verbally indicate, and/or provide a label for the object or activity that is the source of the isolated sound presented to the user. Receiving user input to identify sources of sound and associate the sound with the source may provide systems or methods that can quickly build a large and accurate database of objects and activities and their associated acoustic characteristics.

In one example, user input may also be used to identify activities of the user. The user may provide input indicating what activity the user is engaged in. The system may capture visual, acoustic, physical, and physiological data associated with that activity. Such data may be compared to data associated with other activities to determine unique characteristics of the activity the user is engaged in. In one example, the system may present to the user information about an activity that is being detected by the system. The system may receive user input that confirms or denies that the user is engaged in the detected activity.

In another example, a user may be listening to a flute being played. The hearing device may determine that music is being played based on audio data provided by the audio sensor of the hearing device. The image sensor may capture image data that includes the flute that is being played (e.g., an optical component). A controller of the system may identify the flute using the image data and determine there is a match between the music detected in the audio data and the flute identified in the image data. If there is a match between the detected music and the flute identified in the image data (e.g. determined based on a an Internet or database search confirming that the flute is a musical instrument and that the sound that is being detected has the same acoustic properties as those that are expected of that instrument), an audio object (e.g., an association between the detected sound/music and the flute) may be determined. Additionally, any of the following may occur:

- The time, location and duration of the detected sound may be logged (this may inform probabilities that the hearing devices will use to classify this sound in the future).
- An algorithm or process (e.g. artificial intelligence, machine learning, deep neural network, etc.) may examine the acoustic properties of the flute relative to the generic properties used to classify "music" to determine whether a subclass can be created:
  - if enough information exists, a new class may be created;
  - if not enough information exists, the information that has just been captured (e.g., sound data, image data, audio object, etc.) may be stored; if this instrument is encountered again in the future, the new information may be added to the existing information, and the analysis may be repeated to see if a subclass can be created.
- Information may be uploaded to the cloud (e.g., server, network connected data storage, etc.) to be stored with and/or compared to data from a broader population:
  - information about the acoustics of the sound of the flute;
  - information about how the sound of the flute differs from the broader class of "music";
  - information about how the new subcategory differs from the existing category of "music";
  - information about the specific user's probability of encountering flute music (in general, and compared to other musical sounds).

If there is not a match between the detected music and the flute identified in the image data (e.g., the sound or music was classified as "noise" but the camera categorized it as a musical instrument), then any of the following may occur:

- The class "music" may be broadened such that a flute would now be classified as music.
- Additional analysis may be performed to confirm that the sound that the hearing aids picked up was in fact coming from the flute (e.g., by comparing the location of the sound, as detected by the camera, with the location of the sound, as detected by the hearing aids such as using interaural time and level differences and/or information about how the level or estimated SNR and sound classification change as the person moves throughout the space).
  - if it is confirmed that the sound was coming from the flute, then the audio class "music" may be modified (broadened) such that a flute would now be classified as music;
  - if it is determined that the sound was not coming from the flute, but instead is coming from heating and ventilation sound from vents positioned overhead, then an audio object associating the vents to "HVAC" may be determined to match the detected sound;
  - the user may be asked (auditorily or via an app on a smart device) to confirm the location of the sound source (e.g., where the sound is coming from) or the sound classification (e.g., what the sound is).

Capturing physiological and geographical data along with visual and acoustic data may be useful long-term, for example, when the image sensor is not available. If two activities have similar acoustic properties, but they can be differentiated based on physiological and/or geographical information, then this information may help with accurate audio classification. For example, sitting in a canoe may sound acoustically similar when the other person is rowing vs. when the user is rowing, but information about the individual's heart rate, breathing, and/or skin conductance may allow the system to differentiate between the two. Further, geographic information may help to determine whether someone is in a boat vs. on the shore; and if the user is in a boat, paddle noise and wind noise (along with the direction of the wind, as picked up by the hearing devices) may help to determine whether the boat is drifting or whether someone is paddling.

Embodiments of the disclosure are defined in the claims. However, below there is provided a non-exhaustive listing of non-limiting examples. Any one or more of the features of these examples may be combined with any one or more features of another example, embodiment, or aspect described herein.

Example 1 is a system, comprising:

an image sensor configured to sense optical information of an environment and produce image data indicative of the sensed optical information;

a hearing device comprising:

a housing wearable by a user; and an audio sensor coupled to the housing and configured to sense sound of the environment and provide sound data using the sensed sound; and a controller comprising one or more processors and operatively coupled to the image sensor and the audio sensor, the controller configured to receive the image data and sound data and to:

identify one or more optical components using the image data, each of the one or more optical components associated with an object or activity;

determine one or more audio objects using at least the one or more optical components and the sound data, the one or more audio objects each comprising an association between at least a portion of the sound data and the object or activity; and adjust an audio class using the one or more audio objects, the audio class associated with the object or activity.

Example 2 is a system, comprising:

an image sensor configured to sense optical information of an environment and produce image data indicative of the sensed optical information;

a hearing device comprising:

a housing wearable by a user; and an audio sensor coupled to the housing and configured to sense sound of the environment and provide sound data using the sensed sound; and a controller comprising one or more processors and operatively coupled to the image sensor and the audio sensor, the controller configured to receive the image data and sound data and to:

identify one or more optical components using the image data, each of the one or more optical components associated with an activity;

determine one or more audio objects using at least the one or more optical components and the sound data, the one or more audio objects each comprising an association between at least a portion of the sound data and the activity; and adjust an audio class using the one or more audio objects, the audio class associated with the activity.

Example 3 is the system according to any one of the preceding examples, wherein the controller is further configured to determine a confidence value using the one or more audio objects, and wherein the controller is configured to adjust the audio class in response to the determined confidence value exceeding a threshold confidence value.

Example 4 is the system according to any one of the preceding examples, wherein the controller is configured to adjust a range of an overall sound level of the audio class using the one or more audio objects.

Example 5 is the system according to any one of the preceding examples, wherein the controller is configured to adjust a range of one or more frequency-specific sound levels of the audio class using the one or more audio objects.

Example 6 is the system according to any one of the preceding examples, wherein the controller is configured to adjust a range of one or more spectral or temporal sound characteristics of the audio class using the one or more audio objects.

Example 7 is the system according to any one of the preceding examples, further comprising one more motion sensors operatively coupled to the controller and configured to sense movement of the hearing device and provide movement data indicative of the sensed movement; and wherein the controller is further configured to identify the one or more optical components using the image data and the movement data.

Example 8 is the system according to any one of the preceding examples, wherein the audio class is an environmental audio class.

Example 9 is the system according to any one of the preceding examples, wherein the audio class is a personal audio class.

Example 10 is the system according to any one of the preceding examples, wherein:

the hearing device further comprises a transducer operatively coupled to the controller and configured to provide acoustic information to the user; and the controller is further configured to provide recommendations to the user using the one or more audio objects.

Example 11 is the system according to any one of the preceding examples, wherein:

the hearing device further comprises one or more physiological sensors operably coupled to the controller and configured to sense physiological characteristics of the user; and the controller is further configured to identify the one or more optical components further using the sensed physiological characteristics of the user.

Example 12 is the system according to any one of the preceding examples, wherein the controller is further configured to identify one or more optical components using movement of one or more objects in the image data.

Example 13 is the system according to any one of the preceding examples, wherein the controller is further configured to generate one or more hearing environment settings using the adjusted audio class.

Example 14 is the system according to any one of the preceding examples, further comprising a communication device operably coupled to the controller and configured to transmit or receive data; and wherein the controller is further configured to transmit the one or more audio objects or the adjusted audio class to a database.

Example 15 is the system according to any one of the preceding examples, wherein the hearing device further comprises one or more positional sensors operably coupled to the controller and configured to sense a location of the hearing device; and wherein the controller is further configured to identify the one or more optical components further using the sensed location of the hearing device.

Example 16 is the system according to any one of the preceding examples, wherein the controller is further configured to generate a new audio class in response to an absence of an existing audio class associated with the object or activity of the one or more audio objects or activities.

Example 17 is the system according to any one of the preceding examples, wherein the controller is further configured to adjust one or more settings of the hearing device using the identified optical component.

Example 18 is the system according to any one of the preceding examples, wherein the controller is further configured to adjust one or more settings of the hearing device using the determined one or more audio objects.

Example 19 is the system according to any one of the preceding examples, further comprising a communication device operably coupled to the controller and configured to transmit or receive data; and wherein the controller is further configured to:

receive object information from one or more objects in the environment via the communication device; and identify the one or more optical components further using the received object information.

Example 20 is the system according to any one of the preceding examples, wherein the controller is further configured to:

identify an audio object of the determined one or more audio objects using the sound data in absence of the image data;

determine at least one adjusted audio class using the audio object of the one or more audio objects; and select one or more hearing environment settings using the at least one adjusted audio class.

Example 21 is the system according to example 20, wherein the controller is further configured to determine the at least one adjusted audio class further using data provided by one or more sensors, the data including one or more of sensed physiological characteristics, sensed location, or sensed movement.

Example 22 is the system according to any one of examples 20 and 21, wherein the controller is further configured to determine the at least one adjusted audio class further using information about the user.

Example 23 is the system according to any one of the preceding examples, wherein the controller is further configured to:

receive one or more user inputs; and identify the one or more optical components using the received one or more user inputs.

Example 24 is a system, comprising:

an image sensor configured to sense optical information of an environment and produce image data indicative of the sensed optical information;

a hearing device comprising:

a housing wearable by a user; and an audio sensor coupled to the housing and configured to sense sound of the environment and provide sound data using the sensed sound; and a controller comprising one or more processors and operatively coupled to the image sensor and the audio sensor, the controller configured to receive the image data and sound data and to:

identify one or more optical components using the image data;

determine one or more assistive listening technologies using at least the one or more optical components; and connect to the determined one or more assistive listening technologies.

Example 25 is the system according to example 24, wherein the one or more optical components includes at least one symbol indicating the availability of the one or more assistive listening technologies and wherein the controller is configured to determine the one or more assistive listening technologies in response to identifying the at least one symbol.

Example 26 is the system according to any one of examples 24 and 25, wherein the hearing device comprises one or more communication devices and wherein the controller is further configured to connect to the determined one or more assistive listening technologies using the one or more communication devices.

Example 27 is the system according to any one of examples 24 to 26, wherein the controller is further configured to tag a location of the one or more assistive listening technologies.

Example 28 is a method, comprising:

identifying one or more optical components using image data provided by an image sensor, each of the one or more optical components associated with an object or activity;

determining one or more audio objects using at least the one or more optical components and sound data provided by an audio sensor, the one or more audio objects each comprising an association between at least a portion of the sound data and the object or activity; and adjusting an audio class using the one or more audio objects, the audio class associated with the object or activity.

Example 29 is a method, comprising:

identifying one or more optical components using image data provided by an image sensor, each of the one or more optical components associated with an activity;

determining one or more audio objects using at least the one or more optical components and sound data provided by an audio sensor, the one or more audio objects each comprising an association between at least a portion of the sound data and the activity; and adjusting an audio class using the one or more audio objects, the audio class associated with the activity.

Example 30 is the method according to any one of examples 28 and 29, further comprising:

determining a confidence value using the one or more audio objects; and adjusting the audio class in response to the determined confidence value exceeding a threshold confidence value.

Example 31 is the method according to any one of examples 28 to 30, wherein adjusting the audio class comprises adjusting a range of an overall sound level of the audio class using the one or more audio objects.

Example 32 is the method according to any one of examples 28 to 31, wherein adjusting the audio class comprises adjusting a range of one or more frequency-specific sound levels of the audio class using the one or more audio objects.

Example 33 is the method according to any one of examples 28 to 32, wherein adjusting the audio class comprises adjusting a range of one or more spectral or temporal sound characteristics of the audio class using the one or more audio objects.

Example 34 is the method according to any one of examples 28 to 33, further comprises:

sensing movement of the hearing device using one or more motion sensors; and identifying the one or more optical components using the image data and the movement data.

Example 35 is the method according to any one of examples 28 to 34, wherein the audio class is an environmental audio class.

Example 36 is the method according to any one of examples 28 to 35, wherein the audio class is a personal audio class.

Example 37 is the method according to any one of examples 28 to 36, further comprising:

determining a recommendation using the one or more audio objects; and providing the recommendation to the user using a transducer of the hearing device.

Example 38 is the method according to any one of examples 28 to 37, further comprising:

sensing a physiological characteristic of a user using one or more physiological sensors; and identifying the one or more optical components further using the sensed physiological characteristic of the user.

Example 39 is the method according to any one of examples 28 to 38, further comprising identifying one or more optical components using movement of one or more objects in the image data.

Example 40 is the method according to any one of examples 28 to 39, further comprising generating one or more hearing environment settings using the adjusted audio class.

Example 41 is the method according to any one of examples 28 to 40, further comprising transmitting the one or more audio objects or the adjusted audio class to a database using a communication device.

Example 42 is the method according to any one of examples 28 to 41, further comprising:

sensing a location of the hearing device using one or more location sensors; and identifying the one or more optical components further using the sensed location of the hearing device.

Example 43 is the method according to any one of examples 28 to 42, further comprising generating a new audio class in response to an absence of an existing audio class associated with the object or activity of the one or more audio objects or activities.

Example 44 is the method according to any one of examples 28 to 43, further comprising adjusting one or more settings of the hearing device using the identified optical component.

Example 45 is the method according to any one of examples 28 to 44, further comprising adjusting one or more settings of the hearing device using the determined one or more audio objects.

Example 46 is the method according to any one of examples 28 to 45, further comprising:

receiving object information from one or more objects in the environment via a communication device; and identifying the one or more optical components further using the received object information.

Example 47 is the method according to any one of examples 28 to 46, further comprising:

identifying an audio object of the determined one or more audio objects using the sound data in absence of the image data;

determining at least one adjusted audio class using the audio object of the one or more audio objects; and selecting one or more hearing environment settings using the at least one adjusted audio class.

Example 48 is the method according to example 47, wherein determining the at least one adjusted audio class further comprise using data provided by one or more sensors, the data including one or more of sensed physiological characteristics, sensed location, or sensed movement.

Example 49 is the method according to any one of examples 47 and 48, wherein determining the at least one adjusted audio class further comprises using information about the user.

Example 50 is the method according to any one of examples 28 to 49, further comprising:

receiving one or more user inputs; and identifying the one or more optical components using the received one or more user inputs.

Example 51 is a method, comprising:

identifying one or more optical components using image data provided by an image sensor;

determining one or more assistive listening technologies using at least the one or more optical components; and connecting to the determined one or more assistive listening technologies.

Example 52 is the method according to example 51, wherein the one or more optical components includes at least one symbol indicating the availability of the one or more assistive listening technologies and wherein determining the one or more assistive listening technologies is in response to identifying the at least one symbol.

Example 53 is the method according to any one of examples 51 and 52, further comprising connecting to the determined one or more assistive listening technologies using one or more communication devices.

Example 54 is the method according to any one of examples 51 to 53, wherein the controller is further configured to tag a location of the one or more assistive listening technologies.

Figure 1B:
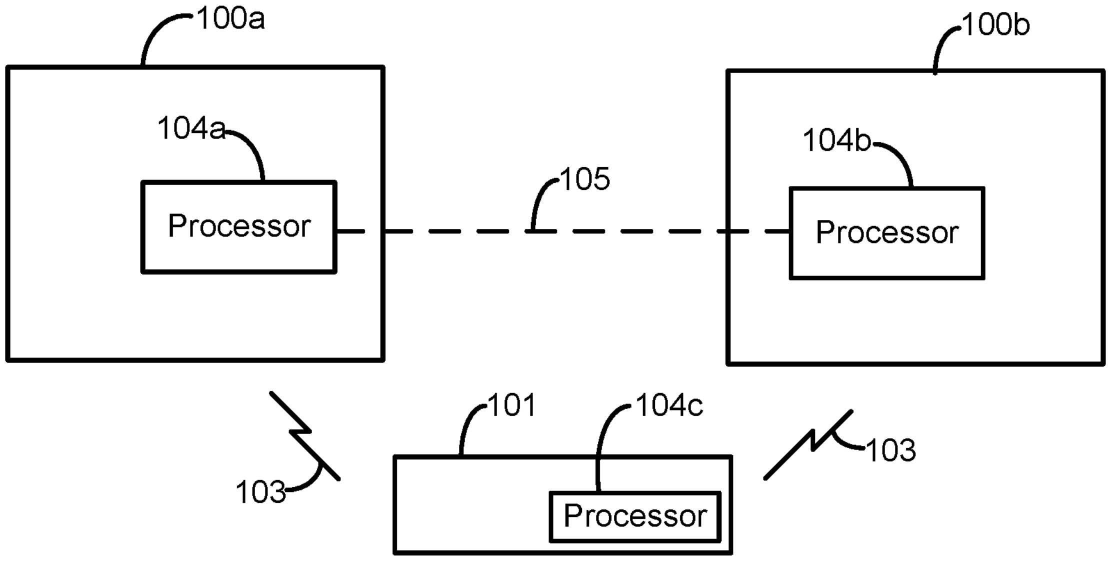
FIG. 1B is a system block diagram of two ear-worn electronic hearing devices configured for use in, on, or about left and right ears of a user in accordance with any of the embodiments disclosed herein.

FIG. 1A is a system block diagram of an ear-worn electronic hearing device configured for use in, on, or about an ear of a user in accordance with any of the embodiments disclosed herein. The hearing device 100 shown in FIG. 1A can represent a single hearing device configured for monaural or single-ear operation or one of a pair of hearing devices configured for binaural or dual-ear operation (see e.g., FIG. 1B). The hearing device 100 shown in FIG. 1A includes a housing 102 within or on which various components are situated or supported.

The hearing device 100 includes a processor 104 operatively coupled to memory 106. The processor 104 can be implemented as one or more of a multi-core processor, a digital signal processor (DSP), a microprocessor, a programmable controller, a general-purpose computer, a special-purpose computer, a hardware controller, a software controller, a combined hardware and software device, such as a programmable logic controller, and a programmable logic device (e.g., FPGA, ASIC). The processor 104 can include or be operatively coupled to memory 106, such as RAM, SRAM, ROM, or flash memory. In some embodiments, processing can be offloaded or shared between the processor 104 and a processor of a peripheral or accessory device.

An audio sensor or microphone arrangement 108 is operatively coupled to the processor 104. The audio sensor 108 can include one or more discrete microphones or a microphone array(s) (e.g., configured for microphone array beamforming). Each of the microphones of the audio sensor 108 can be situated at different locations of the housing 102. It is understood that the term microphone used herein can refer to a single microphone or multiple microphones unless specified otherwise. The microphones of the audio sensor 108 can be any microphone type. In some embodiments, the microphones are omnidirectional microphones. In other embodiments, the microphones are directional microphones. In further embodiments, the microphones are a combination of one or more omnidirectional microphones and one or more directional microphones. One, some, or all of the microphones can be microphones having a cardioid, hypercardioid, supercardioid, or lobar pattern, for example. One, some, or all of the microphones can be multi-directional microphones, such as bidirectional microphones. One, some, or all of the microphones can have variable directionality, allowing for real-time selection between omnidirectional and directional patterns (e.g., selecting between omni, cardioid, and shotgun patterns). In some embodiments, the polar pattern(s) of one or more microphones of the audio sensor 108 can vary depending on the frequency range (e.g., low frequencies remain in an omnidirectional pattern while high frequencies are in a directional pattern).

Depending on the hearing device implementation, different microphone technologies can be used. For example, the hearing device 100 can incorporate any of the following microphone technology types (or combination of types): MEMS (micro-electromechanical system) microphones (e.g., capacitive, piezoelectric MEMS microphones), moving coil/dynamic microphones, condenser microphones, electret microphones, ribbon microphones, crystal/ceramic microphones (e.g., piezoelectric microphones), boundary microphones, PZM (pressure zone microphone) microphones, and carbon microphones.

A telecoil arrangement 112 is operatively coupled to the processor 104, and includes one or more (e.g., 1, 2, 3, or 4) telecoils. It is understood that the term telecoil used herein can refer to a single telecoil or magnetic sensor or multiple telecoils or magnetic sensors unless specified otherwise. Also, the term telecoil can refer to an active (powered) telecoil or a passive telecoil (which only transforms received magnetic field energy). The telecoils of the telecoil arrangement 112 can be positioned within the housing 102 at different angular orientations. The hearing device 100 includes a speaker or a receiver 110 (e.g., an acoustic transducer) capable of transmitting sound from the hearing device 100 to the user's ear drum. A power source 107 provides power for the various components of the hearing device 100. The power source 107 can include a rechargeable battery (e.g., lithium-ion battery), a conventional battery, and/or a supercapacitor arrangement.

The hearing device 100 also includes a motion sensor arrangement 114. The motion sensor arrangement 114 includes one or more sensors configured to sense motion and/or a position of the user of the hearing device 100. The motion sensor arrangement 114 can comprise one or more of an inertial measurement unit or IMU, an accelerometer(s), a gyroscope(s), a nine-axis sensor, a magnetometer(s) (e.g., a compass), and a GPS sensor. The IMU can be of a type disclosed in commonly owned U.S. Pat. No. 9,848,273, which is incorporated herein by reference. In some embodiments, the motion sensor arrangement 114 can comprise two microphones of the hearing device 100 (e.g., microphones of left and right hearing devices 100) and software code executed by the processor 104 to serve as altimeters or barometers. The processor 104 can be configured to compare small changes in altitude/barometric pressure using microphone signals to determine orientation (e.g., angular position) of the hearing device 100. For example, the processor 104 can be configured to sense the angular position of the hearing device 100 by processing microphone signals to detect changes in altitude or barometric pressure between microphones of the audio sensor 108.

The hearing device 100 can incorporate an antenna 118 operatively coupled to a communication device 116, such as a high-frequency radio (e.g., a 2.4 GHz radio). The radio(s) of the communication device 116 can conform to an IEEE 802.11 (e.g., WiFi®) or Bluetooth® (e.g., BLE, Bluetooth® 4.2, 5.0, 5.1 or later) specification, for example. It is understood that the hearing device 100 can employ other radios, such as a 900 MHz radio. In addition, or alternatively, the hearing device 100 can include a near-field magnetic induction (NFMI) sensor for effecting short-range communications (e.g., ear-to-ear communications, ear-to-kiosk communications).

The antenna 118 can be any type of antenna suitable for use with a particular hearing device 100. A representative list of antennas 118 include, but are not limited to, patch antennas, planar inverted-F antennas (PIFAs), inverted-F antennas (IFAs), chip antennas, dipoles, monopoles, dipoles with capacitive-hats, monopoles with capacitive-hats, folded dipoles or monopoles, meandered dipoles or monopoles, loop antennas, Yagi-Udi antennas, log-periodic antennas, and spiral antennas. Many of these types of antenna can be implemented in the form of a flexible circuit antenna. In such embodiments, the antenna 118 is directly integrated into a circuit flex, such that the antenna 118 does not need to be soldered to a circuit that includes the communication device 116 and remaining RF components.

The hearing device 100 also includes a user interface 120 operatively coupled to the processor 104. The user interface 120 is configured to receive an input from the user of the hearing device 100. The input from the user can be a touch input, a gesture input, or a voice input. The user interface 120 can include one or more of a tactile interface, a gesture interface, and a voice command interface. The tactile interface can include one or more manually actuatable switches (e.g., a push button, a toggle switch, a capacitive switch). For example, the user interface 120 can include a number of manually actuatable buttons or switches, at least one of which can be used by the user when customizing the directionality of the audio sensors 108.

Figure 2:
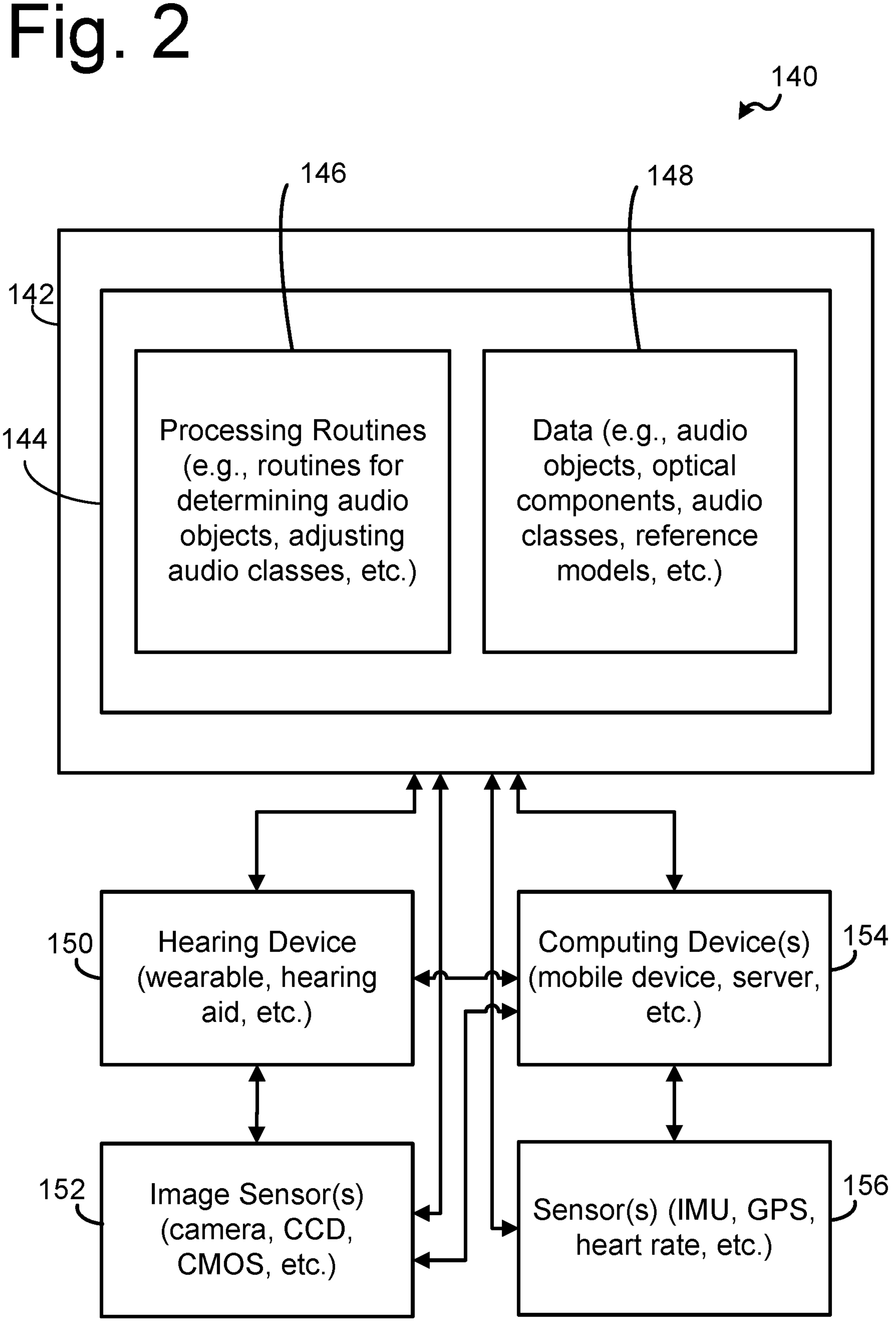
FIG. 2 is a system block diagram of a system in accordance with any of the embodiments disclosed herein.

FIG. 2 is an exemplary schematic block diagram of a system 140 according to embodiments described herein. The system 140 may include a processing apparatus or processor 142 and a hearing device 150 (e.g., hearing device 100 of FIG. 1A). Generally, the hearing device 150 may be operably coupled to the processing apparatus 142 and may include any one or more devices (e.g., audio sensors) configured to generate audio data from sound and provide the audio data to the processing apparatus 142. The hearing device 150 may include any apparatus, structure, or device configured to convert sound into sound data. For example, the hearing device 150 may include one or more diaphragms, crystals, spouts, application-specific integrated circuits (ASICs), membranes, sensors, charge pumps, etc.

The sound data generated by the hearing device 150 may be provided to the processing apparatus 142, e.g., such that the processing apparatus 142 may analyze, modify, store, and/or transmit the sound data. Further, such sound data may be provided to the processing apparatus 142 in a variety of different ways. For example, the sound data may be transferred to the processing apparatus 142 through a wired or wireless data connection between the processing apparatus 142 and the hearing device 150.

The system 140 may additionally include an image sensor 152 operably coupled to the processing apparatus 142. Generally, the image sensor 152 may include any one or more devices configured to sense optical information of an environment and produce image data indicative of the sensed optical information. For example, the image sensor 152 may include one or more lenses, cameras, optical sensors, infrared sensors, charged-coupled devices (CCDs), complementary metal-oxide semiconductors (CMOS), mirrors, etc. The image data generated by the image sensor 152 may be received by the processing apparatus 142. The image data may be provided to the processing apparatus 142 in a variety of different ways. For example, the image data may be transferred to the processing apparatus 142 through a wired or wireless data connection between the processing apparatus 142 and the image sensor 152. Image data may include pictures, video, pixel data, etc.

The image sensor 152 may be an image sensor accessory (e.g., smart glasses, wearable image sensor, etc.). Additionally, the image sensor 152 may include any suitable apparatus to allow the image sensor 152 to be worn or attached to a user. Furthermore, the image sensor may include other sensors that may help classify the typical environments and activities of the user. The image sensor 152 may include one or more controllers, processors, memories, wired or wireless communication devices, etc.

The system 140 may additionally include a computing device 154 operably coupled to the processing apparatus 142. Additionally, the computing device 154 may be operably coupled to the hearing device 150, the image sensor 152, or both. Generally, the computing device 154 may include any one or more devices configured to assist in collecting or processing data such as, e.g., a mobile compute device, a laptop, a tablet, a personal digital assistant, a smart speaker system, a smart car system, a smart watch, smart ring, chest strap a TV streamer device, wireless audio streaming device, cell phone or landline streamer device, Direct Audio Input (DAI) gateway device, auxiliary audio input gateway device, telecoil/magnetic induction receiver device, hearing device programmer, charger, hearing device storage/drying box, smartphone, and wearable or implantable health monitor, etc. The computing device 154 may receive sound data from the hearing device 150 and image data from the image sensor 152. The computing device 154 may be configured to carry out the exemplary techniques, processes, and algorithms of identifying one or more optical components, determining one or more audio objects, and adjusting an audio class using the one or more audio objects.

The system 140 may additionally include one or more sensors 156 operably coupled to the processing apparatus 142. Additionally, the one or more sensors 156 may be operably coupled to the computing device 154. Generally, the one or more sensors 156 may include any one or more devices configured to sense physiological and geographical information about the user or to receive information about objects in the environment from the objects themselves. The one or more sensors 156 may include any suitable device to capture physiological and geographical information such as, e.g., a heart rate sensor, a temperature sensor, a Global Positioning System (GPS) sensor, an Inertial Measurement Unit (IMU), a barometric pressure sensor, an altitude sensor, acoustic sensor, telecoil/magnetic sensor, electroencephalogram (EEG) sensors, etc. Physiological sensors may be used to track or sense information about the user such as, e.g., heart rate, temperature, steps, head movement, body movement, skin conductance, user engagement, etc. The one or more sensors 156 may also track geographic or location information of the user. The one or more sensors 156 may be included in one or more of a wearable device, the hearing device 150 or the computing device 152. The one or more sensors 156 may be used to determine aspects of a user's acoustical or social environment as described in U.S. Provisional Patent Application 62/800,227, filed Feb. 1, 2019, the entire content of which is incorporated by reference.

Further, the processing apparatus 142 includes data storage 144. Data storage 144 allows for access to processing programs or routines 146 and one or more other types of data 148 that may be employed to carry out the exemplary techniques, processes, and algorithms of identifying one or more optical components, determining one or more audio objects, and adjusting an audio class using the one or more audio objects. For example, processing programs or routines 146 may include programs or routines for performing object recognition, image processing, audio class generation, computational mathematics, matrix mathematics, Fourier transforms, compression algorithms, calibration algorithms, image construction algorithms, inversion algorithms, signal processing algorithms, normalizing algorithms, deconvolution algorithms, averaging algorithms, standardization algorithms, comparison algorithms, vector mathematics, analyzing sound data, analyzing hearing device settings, detecting defects, or any other processing required to implement one or more embodiments as described herein.

Data 148 may include, for example, sound data (e.g., noise data, etc.), image data, audio classes, audio objects, activities, optical components, hearing impairment settings, thresholds, hearing device settings, arrays, meshes, grids, variables, counters, statistical estimations of accuracy of results, results from one or more processing programs or routines employed according to the disclosure herein (e.g., determining an audio object, adjusting an audio class, etc.), or any other data that may be necessary for carrying out the one or more processes or techniques described herein.

In one or more embodiments, the system 140 may be controlled using one or more computer programs executed on programmable computers, such as computers that include, for example, processing capabilities (e.g., microcontrollers, programmable logic devices, etc.), data storage (e.g., volatile or non-volatile memory and/or storage elements), input devices, and output devices. Program code and/or logic described herein may be applied to input data to perform functionality described herein and generate desired output information. The output information may be applied as input to one or more other devices and/or processes as described herein or as would be applied in a known fashion.

The programs used to implement the processes described herein may be provided using any programmable language, e.g., a high-level procedural and/or object orientated programming language that is suitable for communicating with a computer system. Any such programs may, for example, be stored on any suitable device, e.g., a storage media, readable by a general or special purpose program, computer or a processor apparatus for configuring and operating the computer when the suitable device is read for performing the procedures described herein. In other words, at least in one embodiment, the system 140 may be controlled using a computer readable storage medium, configured with a computer program, where the storage medium so configured causes the computer to operate in a specific and predefined manner to perform functions described herein.

The processing apparatus 142 may be, for example, any fixed or mobile computer system (e.g., a personal computer or minicomputer). The exact configuration of the computing apparatus is not limiting and essentially any device capable of providing suitable computing capabilities and control capabilities (e.g., control the sound output of the system 140, the acquisition of data, such as image data, audio data, or sensor data) may be used. Additionally, the processing apparatus 142 may be incorporated in the hearing device 150 or in the computing device 154. Further, various peripheral devices, such as a computer display, mouse, keyboard, memory, printer, scanner, etc. are contemplated to be used in combination with the processing apparatus 142. Further, in one or more embodiments, the data 148 (e.g., image data, sound data, voice data, audio classes, audio objects, optical components, hearing impairment settings, hearing device settings, an array, a mesh, a digital file, etc.) may be analyzed by a user, used by another machine that provides output based thereon, etc. As described herein, a digital file may be any medium (e.g., volatile or non-volatile memory, a CD-ROM, a punch card, magnetic recordable tape, etc.) containing digital bits (e.g., encoded in binary, trinary, etc.) that may be readable and/or writable by processing apparatus 142 described herein. Also, as described herein, a file in user-readable format may be any representation of data (e.g., ASCII text, binary numbers, hexadecimal numbers, decimal numbers, audio, graphical) presentable on any medium (e.g., paper, a display, sound waves, etc.) readable and/or understandable by a user.

In view of the above, it will be readily apparent that the functionality as described in one or more embodiments according to the present disclosure may be implemented in any manner as would be known to one skilled in the art. As such, the computer language, the computer system, or any other software/hardware that is to be used to implement the processes described herein shall not be limiting on the scope of the systems, processes or programs (e.g., the functionality provided by such systems, processes or programs) described herein.

The techniques described in this disclosure, including those attributed to the systems, or various constituent components, may be implemented, at least in part, in hardware, software, firmware, or any combination thereof. For example, various aspects of the techniques may be implemented by the processing apparatus 142, which may use one or more processors such as, e.g., one or more microprocessors, DSPs, ASICs, FPGAs, CPLDs, microcontrollers, or any other equivalent integrated or discrete logic circuitry, as well as any combinations of such components, image processing devices, or other devices. The term "processing apparatus," "processor," or "processing circuitry" may generally refer to any of the foregoing logic circuitry, alone or in combination with other logic circuitry, or any other equivalent circuitry. Additionally, the use of the word "processor" may not be limited to the use of a single processor but is intended to connote that at least one processor may be used to perform the exemplary techniques and processes described herein.

Such hardware, software, and/or firmware may be implemented within the same device or within separate devices to support the various operations and functions described in this disclosure. In addition, any of the described components may be implemented together or separately as discrete but interoperable logic devices. Depiction of different features, e.g., using block diagrams, etc., is intended to highlight different functional aspects and does not necessarily imply that such features must be realized by separate hardware or software components. Rather, functionality may be performed by separate hardware or software components, or integrated within common or separate hardware or software components.

When implemented in software, the functionality ascribed to the systems, devices and techniques described in this disclosure may be embodied as instructions on a computer-readable medium such as RAM, ROM, NVRAM, EEPROM, FLASH memory, magnetic data storage media, optical data storage media, or the like. The instructions may be executed by the processing apparatus 142 to support one or more aspects of the functionality described in this disclosure.

Figure 3:
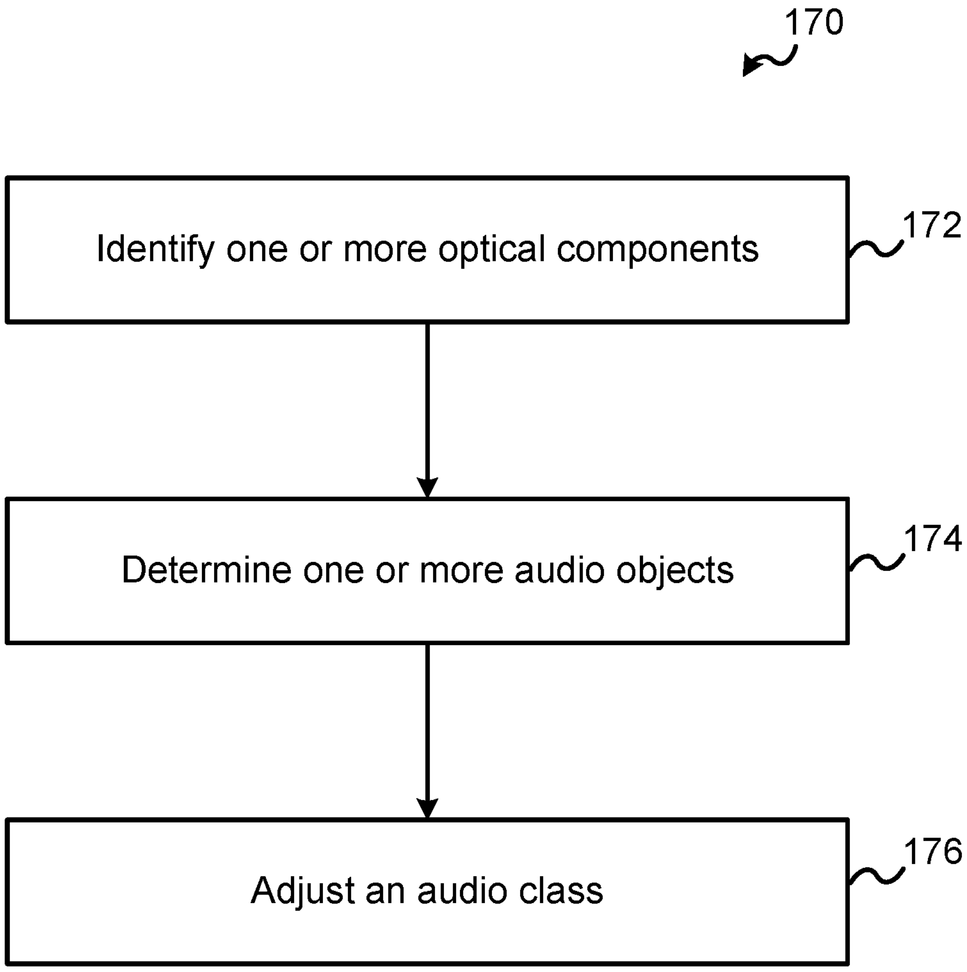
FIG. 3 is a flow diagram of a method in accordance with any of the embodiments disclosed herein.

FIG. 3 illustrates a method 170 of classifying acoustic environments. The method 170 involves identifying 172 one or more optical components using image data. An image sensor may sense optical information of an environment and produce the image data. The image data may be indicative of the sensed optical information. Each of the one or more optical components may be associated with an object or activity. In some examples, each of the one or more optical components may be associated with an activity. The one or more optical components may be text or symbols. Identifying optical components may include object or movement recognition. Object or movement recognition may be paired with sensor data to determine an activity. For example, an image frame of the image data may be determined to move up and down while inertial sensors provide movement data indicative of the user moving up and down as though they are jumping. Additionally, a rope may be identified at least occasionally in such image data. Accordingly, one optical component may be identified as the rope associated with an activity of jumping rope.

The method 170 involves determining 174 one or more audio objects. The one or more audio objects may be determined using at least the one or more optical components and sound data. The sound data may be provided by an audio sensor. The audio sensor may be configured to sense sound of the environment and provide sound data using the sensed sound. The audio sensor may be a component of a hearing device (e.g., hearing device 100 of FIG. 1).

Audio objects may comprise an association between at least a portion of the sound data and the object or activity. For example, an audio object may include sound data associated with the activity of jumping rope. The sound data associated with jumping rope may include a sound levels of various frequencies of the sound made while the rope hits the ground and moves through the air. In another example, an audio object may include sound data associated with a fan. The sound data associated with the fan may include sound levels of frequencies of the sound made by the fan motor or fan blades moving. Additionally, the sound data associated with the fan may include a signal to noise ratio (SNR). Audio objects may include additional information about the object or activity. For example, the audio objects may include information such as, e.g., a location, position, object brand, activity intensity, etc. Audio objects may be linked to a specific person or environment.

The method 170 involves adjusting 176 an audio class. The audio class may be adjusted using the one or more audio objects. Adjusting the audio class may include adjusting the range of an overall sound level of the audio class, adjusting the range of a frequency-specific sound levels of the audio class, adjusting the range of one or more temporal characteristics of an audio class (e.g. the energy of signal, zero crossing rate, maximum amplitude, minimum energy, periodicity, etc.), adjusting the range of one or more spectral characteristics of an audio class (e.g. fundamental frequency, frequency components, frequency relationships, spectral centroid, spectral flux, spectral density, spectral roll-off, etc.), etc. In some examples, a confidence value may be determined using the one or more audio objects. For example, as more data is collected (e.g., image data and sound data) regarding the same or similar audio objects a confidence value associated with such audio objects may increase. The audio class may be adjusted in response to the determined confidence value exceeding a threshold. The audio class may be adjusted using information about the user. In one example, the audio class may be an environmental audio class. In one example, the audio class may be a personal audio class. The adjusted audio class may be used to generate one or more hearing environment settings. A new audio class may be generated in response to an absence of an existing audio class associated with the object or activity of the one or more audio objects or activities.

Identification of optical objects, determining audio objects, and adjusting audio classes may be aided by additional sensors. In some examples, movement of the hearing device may be sensed using one or more motion sensors. Movement data indicative of the sensed movement may be provided by the one or more motion sensors. The one or more optical components may be identified using image data and the movement data. In some examples, physiological characteristics of the user may be sensed using one or more physiological sensors. The one or more optical components may further be identified using the sensed physiological characteristics of the user. In some examples, a location of the hearing device may be sensed using one or more positional sensors. In one example, the one or more optical components may further be identified using the sensed location. In some examples, the one or more optical components may be identified using movement of one or more objects in the image data.

In some examples, acoustic information may be provided to the user using a transducer of the hearing device. In one example, recommendations may be provided to the user in response to the one or more audio objects. Recommendations may include, for example, advice on meal portions, advice related to current exercise or activities, advice on how to limit noise from noise sources, etc.

The one or more audio objects or one or more audio classes may be transmitted to a database or other computing device using a communication device. Object information of one or more objects in the environment may be received using the communication device. For example, the object information may be received from the one or more objects in the environment. The object information may be received from the one or more objects in the environment using, for example, smart devices using WiFi, Bluetooth, NFC, or other communication protocol as described herein. The one or more optical components may be identified using the received object information.

In some examples, one or more settings of the hearing device may be adjusted using the identified optical component. In some examples, one or more settings of the hearing device may be adjusted using the determined one or more audio objects. In some examples, an audio object of the determined one or more audio objects may be identified using the sound data in absence of the image data. An adjusted audio class may be determined using the audio object of the one or more audio objects. One or more hearing environment settings may be selected using the at least one adjusted audio class.

Figure 4:
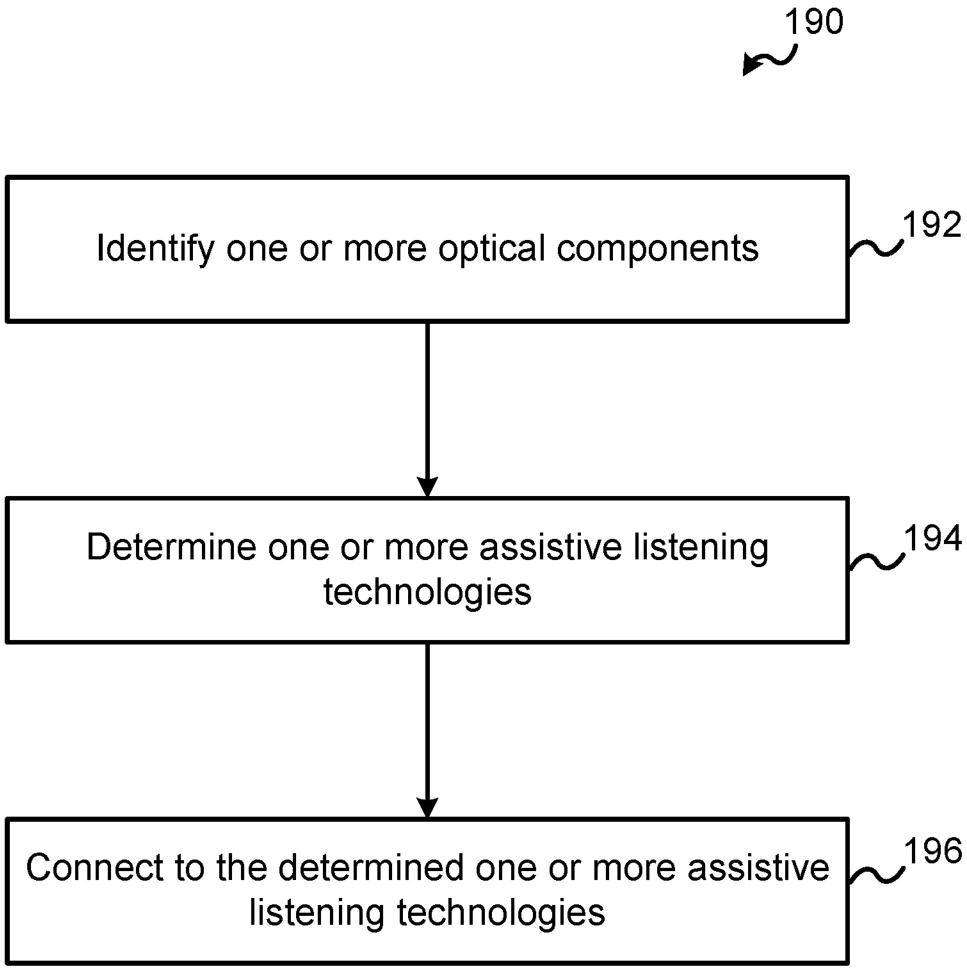
FIG. 4 is a flow diagram of another method in accordance with any of the embodiments disclosed herein.

FIG. 4 illustrates a method 190 of identifying and connecting to assistive listening technologies. The method 190 involves identifying 192 one or more optical components. An image sensor may sense optical information of an environment and produce the image data. The image data may be indicative of the sensed optical information. The one or more optical components may include text or symbols.

The method 190 involves determining 194 one or more assistive listening technologies using the one or more optical components. The one or more optical components may include text or symbols that indicate one or more assistive listening technologies. The text or symbols may further indicate instructions or codes for connecting to assistive listening technologies. A controller may be used to identify the one or more assistive listening technologies using the one or more optical components. The controller may further be used to identify instructions or codes for connecting to the one or more assistive listening technologies.

The method 190 involves connecting 196 to the determined one or more assistive listening technologies. Settings of the hearing device may be adjusted to connect to the one or more assistive listening technologies. Connecting to the one or more assistive listening technologies may include putting the hearing device in telecoil or loop mode, connecting the hearing device to a Bluetooth connection, connecting to a radio transmission, etc.

Although reference is made herein to the accompanying set of drawings that form part of this disclosure, one of at least ordinary skill in the art will appreciate that various adaptations and modifications of the embodiments described herein are within, or do not depart from, the scope of this disclosure. For example, aspects of the embodiments described herein may be combined in a variety of ways with each other. Therefore, it is to be understood that, within the scope of the appended claims, the claimed invention may be practiced other than as explicitly described herein.

All references and publications cited herein are expressly incorporated herein by reference in their entirety into this disclosure, except to the extent they may directly contradict this disclosure. Unless otherwise indicated, all numbers expressing feature sizes, amounts, and physical properties used in the specification and claims may be understood as being modified either by the term "exactly" or "about." Accordingly, unless indicated to the contrary, the numerical parameters set forth in the foregoing specification and attached claims are approximations that can vary depending upon the desired properties sought to be obtained by those skilled in the art utilizing the teachings disclosed herein or, for example, within typical ranges of experimental error.

The recitation of numerical ranges by endpoints includes all numbers subsumed within that range (e.g., 1 to 5 includes 1, 1.5, 2, 2.75, 3, 3.80, 4, and 5) and any range within that range. Herein, the terms "up to" or "no greater than" a number (e.g., up to 50) includes the number (e.g., 50), and the term "no less than" a number (e.g., no less than 5) includes the number (e.g., 5).

The terms "coupled" or "connected" refer to elements being attached to each other either directly (in direct contact with each other) or indirectly (having one or more elements between and attaching the two elements). Either term may be modified by "operatively" and "operably," which may be used interchangeably, to describe that the coupling or connection is configured to allow the components to interact to carry out at least some functionality (for example, a radio chip may be operably coupled to an antenna element to provide a radio frequency electric signal for wireless communication).

Terms related to orientation, such as "top," "bottom," "side," and "end," are used to describe relative positions of components and are not meant to limit the orientation of the embodiments contemplated. For example, an embodiment described as having a "top" and "bottom" also encompasses embodiments thereof rotated in various directions unless the content clearly dictates otherwise.

Reference to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiments.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the disclosure.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

As used herein, "have," "having," "include," "including," "comprise," "comprising" or the like are used in their open-ended sense, and generally mean "including, but not limited to." It will be understood that "consisting essentially of," "consisting of" and the like are subsumed in "comprising," and the like. The term "and/or" means one or all of the listed elements or a combination of at least two of the listed elements.

The phrases "at least one of," "comprises at least one of," and "one or more of" followed by a list refers to any one of the items in the list and any combination of two or more items in the list.

What is claimed is:

1. A system, comprising:

an image sensor configured to sense optical information of an environment and produce image data indicative of the sensed optical information;

a hearing device comprising:

a housing wearable by a user; and an audio sensor coupled to the housing and configured to sense sound of the environment and provide sound data using the sensed sound; and a controller comprising one or more processors and operatively coupled to the image sensor and the audio sensor, the controller configured to receive the image data and sound data and to:

identify one or more optical components using the image data, each of the one or more optical components associated with an object or activity;

determine one or more audio objects using at least the one or more optical components and the sound data, the one or more audio objects each comprising an association between at least a portion of the sound data and the object or activity; and adjust an audio class using the one or more audio objects, the audio class associated with the object or activity.

2. The system according to claim 1, wherein each of the one or more optical components is associated with the activity;

the one or more audio objects each comprise an association between at least a portion of the sound data and the activity; and the controller is configured to adjust the audio class using the one or more audio objects, the audio class associated with the activity.

3. The system according to claim 1, wherein the controller is configured to:

determine a confidence value using the one or more audio objects, and adjust the audio class in response to the determined confidence value exceeding a threshold confidence value.

4. The system according to claim 1, wherein the controller is configured to one of more of:

adjust a range of an overall sound level of the audio class using the one or more audio objects;

adjust a range of one or more frequency-specific sound levels of the audio class using the one or more audio objects; and adjust a range of one or more spectral or temporal sound characteristics of the audio class using the one or more audio objects.

5. The system according to claim 1, comprising one more motion sensors operatively coupled to the controller and configured to sense movement of the hearing device and provide movement data indicative of the sensed movement;

wherein the controller is configured to identify the one or more optical components using the image data and the movement data.

6. The system according to claim 1, wherein the audio class is one or both of an environmental audio class and a personal audio class.

7. The system according to claim 1, wherein:

the hearing device comprises one or more physiological sensors operably coupled to the controller and configured to sense one or more physiological characteristics of the user; and the controller is configured to identify the one or more optical components further using the sensed physiological characteristics of the user.

8. The system according to claim 1, wherein the controller is configured to generate one or more hearing environment settings using the adjusted audio class.

9. The system according to claim 1, wherein the controller is configured to generate a new audio class in response to an absence of an existing audio class associated with the object or activity of the one or more audio objects or activities.

10. The system according to claim 1, wherein:

the hearing device comprises one or more positional sensors operably coupled to the controller and configured to sense a location of the hearing device; and the controller is configured to identify the one or more optical components further using the sensed location of the hearing device.

11. The system according to claim 1, wherein the controller is configured to adjust one or both of:

one or more settings of the hearing device using the identified optical component; and one or more settings of the hearing device using the determined one or more audio objects.

12. The system according to claim 1, wherein the controller is further configured to:

identify an audio object of the determined one or more audio objects using the sound data in the absence of the image data;

determine at least one adjusted audio class using the audio object of the one or more audio objects; and select one or more hearing environment settings using the at least one adjusted audio class.

13. The system according to claim 1, comprising a communication device operably coupled to the controller and configured to one or both of transmit and receive data, wherein the controller is configured to one or both of:

transmit the one or more audio objects or the adjusted audio class to a database; and receive object information from one or more objects in the environment via the communication device and identify the one or more optical components further using the received object information.

14. The system according to claim 1, wherein the controller is configured to:

determine one or more assistive listening technologies using at least the one or more optical components; and connect to the determined one or more assistive listening technologies.

15. A method, comprising:

identifying one or more optical components using image data provided by an image sensor, each of the one or more optical components associated with an object or activity;

determining one or more audio objects using at least the one or more optical components and sound data provided by an audio sensor, the one or more audio objects each comprising an association between at least a portion of the sound data and the object or activity; and adjusting an audio class using the one or more audio objects, the audio class associated with the object or activity.

16. The method according to claim 15, further comprising one or both of:

adjusting one or more settings of the hearing device using the identified optical component; and adjusting one or more settings of the hearing device using the determined one or more audio objects.

17. The method according to claim 15, further comprising one or more of:

adjusting a range of an overall sound level of the audio class using the one or more audio objects;

adjusting a range of one or more frequency-specific sound levels of the audio class using the one or more audio objects; and adjusting a range of one or more spectral or temporal sound characteristics of the audio class using the one or more audio objects.

18. The method according to claim 15, further comprising:

sensing movement of the hearing device using one or more motion sensors; and identifying the one or more optical components using the image data and the movement data.

19. The method according to claim 15, further comprising:

sensing a physiological characteristic of a user using one or more physiological sensors; and identifying the one or more optical components further using the sensed physiological characteristic of the user.

20. The method according to claim 15, further comprising:

identifying an audio object of the determined one or more audio objects using the sound data in absence of the image data;

determining at least one adjusted audio class using the audio object of the one or more audio objects; and selecting one or more hearing environment settings using the at least one adjusted audio class.

21. The method according to claim 15, wherein each of the one or more optical components is associated with the activity;

the one or more audio objects each comprise an association between at least a portion of the sound data and the activity; and the method comprises adjusting the audio class using the one or more audio objects, the audio class associated with the activity.

22. The method according to claim 15, further comprising:

determining a confidence value using the one or more audio objects, and adjusting the audio class in response to the determined confidence value exceeding a threshold confidence value.

* * * * *